UNITED STATES PATENT OFFICE.

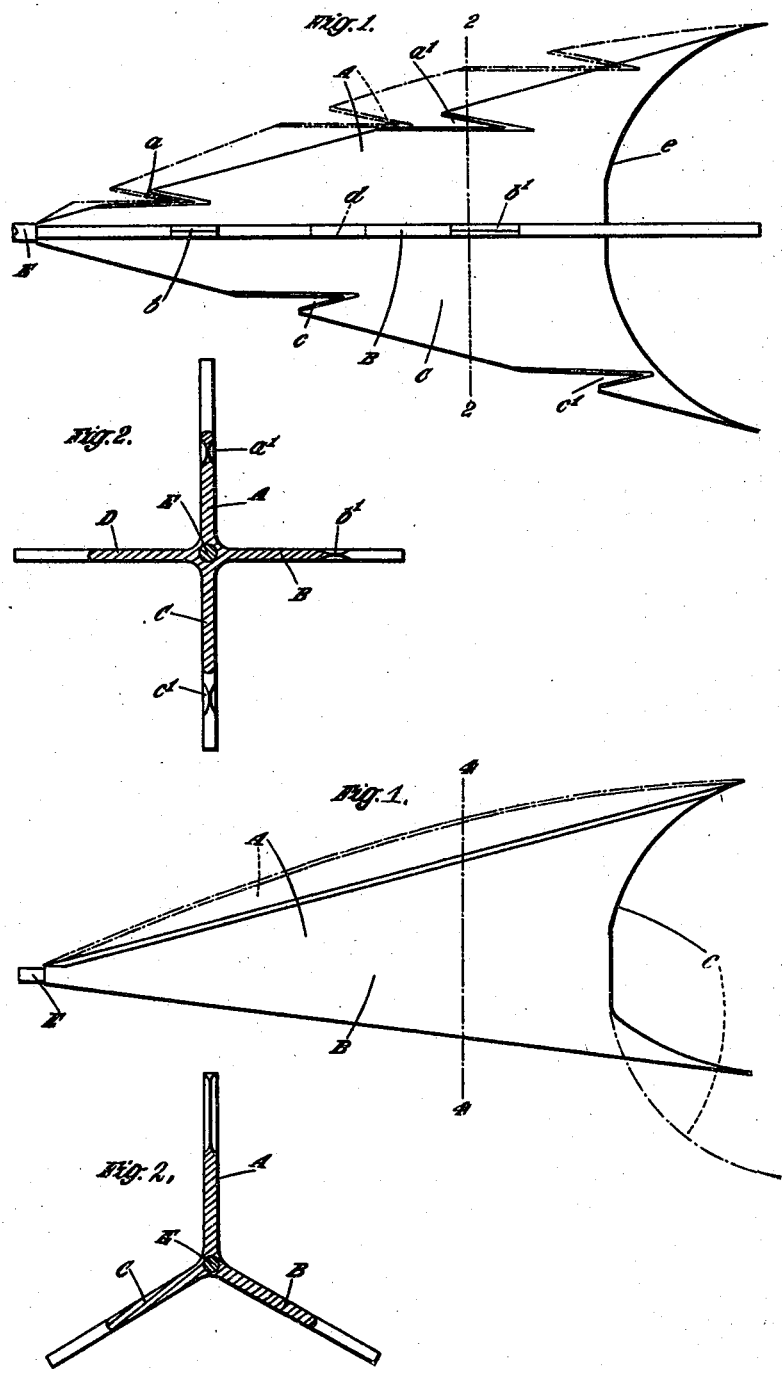

EDGAR LEES AND HERBERT WHEATLEY RIDSDALE, OF WEYMOUTH, ENGLAND, ASSIGNORS TO THE WHITEHEAD TORPEDO WORKS (WEYMOUTH) LIMITED, OF WEYMOUTH, ENGLAND.

NET-CUTTER OF AUTOMOBILE TORPEDOES.

1,309,252.      Specification of Letters Patent.      Patented July 8, 1919.

Application filed May 29, 1918. Serial No. 237,341.

*To all whom it may concern:*

Be it known that we, EDGAR LEES and HERBERT WHEATLEY RIDSDALE, both subjects of the King of Great Britain, residing at Portland Harbour Torpedo Works, Weymouth, in the county of Dorset, England, have invented certain new and useful Improvements in or Relating to the Net-Cutters of Automobile Torpedoes, of which the following is a specification.

The present invention relates to the net cutters of automobile torpedoes. These cutters as hitherto designed have been generally more or less defective owing to the fact that, though the kind of net that may be encountered under war conditions cannot be predicted with certainty, the cutters have either been suitable for dealing with only a limited range of diameter or size of mesh, or for any diameter of mesh in which case (as in the lance-head type of cutter) the cutting is done on so many edges at once (generally four) that the effectiveness is greatly reduced. It must be assumed that the net to be encountered may have a mesh of any diameter, the maximum being nearly that of the torpedo itself. Evidently those cutters which have only one cutting position, near the axis of the torpedo, will be ineffective in the case of the torpedo entering a large mesh nearly co-axially, while those cutters (such as the lance-head type) having about four cutting edges extending from a point near the axis for a distance approximately equal to half the diameter of the torpedo, will, on encountering any sized mesh, be liable to cut on all their sides at once, thus reducing the cutting efficiency; the momentum of the torpedo may thereby be so much reduced that not enough remains to effect any further cutting, though in the case of a net having a small mesh the cutting of several meshes may be necessary to enable the torpedo to pass through the net. Again a torpedo provided with cutters arranged at or near the part of greatest diameter may be arrested if two or more of them come into operation simultaneously on the very thick strand which is characteristic of a large mesh net, or in the case of the torpedo encountering a small mesh net, the cutting done near one side of the maximum diameter may leave sufficient meshes intact elsewhere to arrest the torpedo. Moreover some of the existing cutters are so designed that parts of two meshes are liable to enter the jaws of the cutter at one time, in which case the torpedo is arrested unless both parts can be cut by the one cutter.

According to our invention we provide a cutter of the lance-head type having two or more blades which are so constructed and arranged that a net having a mesh of any diameter can be cut in only one place at a time, so that whatever may be the diameter of mesh there will always be a cutter appropriate for dealing with it. The ordinary striker for firing the explosive charge may be prolonged and the prolongation made of sufficient length to enable the usual whiskers to be dispensed with without seriously increasing the angle of ineffective impact of the torpedo. The cutter surrounds this prolonged striker, and consists essentially of two, three or more radial blades. As a small angle of ineffective impact is much more important in the horizontal than in the vertical plane, the profile of those blades which lie in or near the horizontal plane should not project beyond a straight line which is a tangent to the horizontal profile of the torpedo and passes through the end of the striker prolongation. Those blades which lie in or near the vertical plane may on the other hand exceed the limits of a straight line which is a tangent to the vertical profile of the torpedo and passes through the end of the striker prolongation.

One only of the blades may be provided with a cutting edge which may be beveled, serrated or sharpened, the remaining blades being left relatively blunt, and in this case all the blades have straight or smoothly curved profiles. It will be seen that such a cutter can only cut one mesh at a time and at only one point on the circumference of the mesh, while being suitable for dealing with any diameter of mesh.

In order that the said invention may be clearly understood and readily carried into effect, we will describe the same more fully with reference to the accompanying drawings, in which:—

Figure 1 is a side elevation showing diagrammatically a form of our improved cutter, and Fig. 2 is a section taken approximately on the line 4, 4 of Fig. 3 and viewed from the front.

In Figs. 1 and 2 a three-bladed cutter is shown. Each blade is of straight or smoothly curved profile, only one of these blades (the vertical one A in the example shown) being formed with a cutting edge, the others being merely rounded. The said vertical blade may, as indicated by chain lines in Fig. 1, project beyond a line which is a tangent to the warhead $e$ and passes through the end of the striker prolongation E.

What we claim and desire to secure by Letters Patent of the United States is:—

1. In an automobile torpedo, a net cutter of the lance-head type having a plurality of blades which will cut a net having a mesh of any diameter in only one place at a time.

2. In an automobile torpedo, a net cutter of the lance-head type having a plurality of blades only one of which is formed with a cutting edge.

3. In an automobile torpedo, a net cutter of the lance-head type having three blades one of which is vertical and formed with a cutting edge and the others are unprovided with cutting edges and arranged at an angle of substantially one hundred and twenty degrees from each other and from the vertical blade.

4. In an automobile torpedo, the combination with a net cutter of the lance-head type having a plurality of blades which will cut a net having a mesh of any diameter in only one place at a time, of a striker extending beyond the front of said blades of which each of those in or near a horizontal plane does not project beyond a line which is tangential to the torpedo and passes through the outer end of said striker.

In testimony whereof we affix our signatures.

EDGAR BEES.
HERBERT WHEATLEY RIDSDALE.

Copies of this patent may be obtained for five cents each, by addressing the "Commissioner of Patents, Washington, D. C."